Jan. 16, 1934.   J. H. FLATLEY   1,943,594
COMBINED CONNECTING AND ADJUSTING DEVICE
Filed April 24, 1931
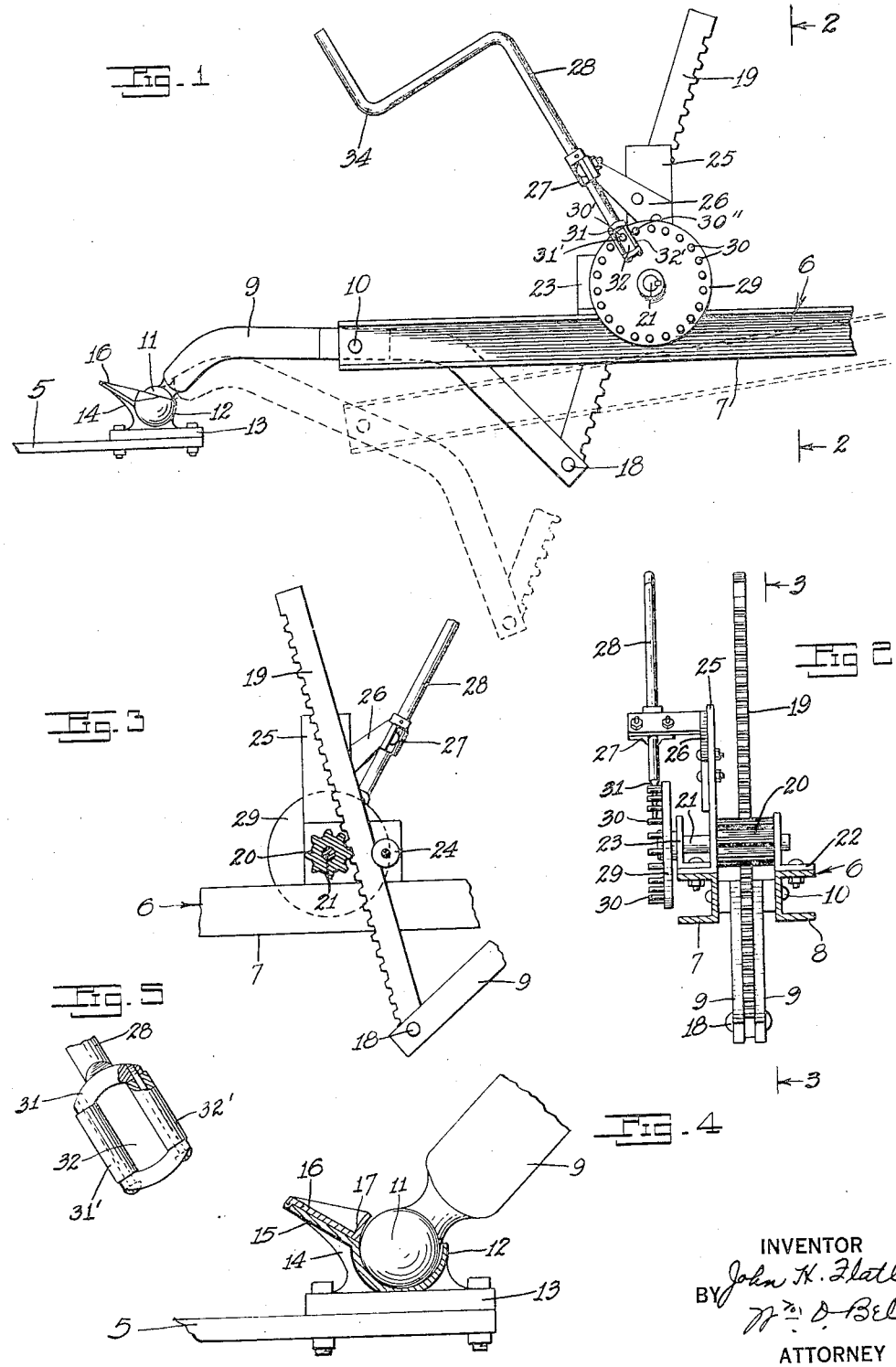
INVENTOR
John H. Flatley
BY
Wm. D. Bell
ATTORNEY Patented Jan. 16, 1934

1,943,594

UNITED STATES PATENT OFFICE 1,943,594

COMBINED CONNECTING AND ADJUSTING DEVICE

John H. Flatley, Little York, Ill., assignor to Brown Lynch Scott Co., Monmouth, Ill., a corporation of Illinois Application April 24, 1931. Serial No. 532,512

10 Claims. (Cl. 280—33.44)

This invention relates to improvements in combined connecting and adjusting devices of the kind used, for example, to attach farm implements or the like to tractive devices, such as tractors. It has been the custom to employ a clevis or the like for this purpose but such devices limit the relative turning movement between the implement and the tractor which is objectionable for many reasons and one of the objects of my invention is to provide a connection affording unrestricted turning of the implement relative to the tractor.

Implements drawn by tractors are usually of the two-wheel type and they are adjustable on their axles to control their operation as, for example, in a harrow the frame carrying the discs is turned about the axle to vary the depth of cut.

Another object is to simplify and facilitate the adjustment of the implement which is of special importance since the operator usually rides on the tractor in advance of the implement.

A further object is to secure the implement against displacement after it is arranged in adjusted position.

It is often desirable to change from one implement to another and a further object is to provide a connection which will greatly facilitate such changing.

In the selected embodiment of the invention illustrated in the accompanying drawing Fig. 1 is a fragmentary side elevation illustrating my connection arranged between the drawbars of a tractor and an implement to be drawn thereby;

Fig. 2 is a view taken substantially on the line 2—2 on Fig. 1;

Fig. 3 is a view taken substantially on the line 3—3 on Fig. 2;

Fig. 4 is a fragmentary detail view of the ball and socket connection employed in the device; and Fig. 5 is a detail view of a portion of the operating device drive.

In the drawing 5 indicates the drawbar of a tractor and 6 indicates the drawbar of a farm implement or the like. The drawbar 6 includes outwardly opening parallel channel irons 7 and 8 and pivotally mounted therebetween, at 10, is a draft lever 9. At one end of the draft lever is a ball 11 and on the plate 13, mounted on the drawbar 5, is a semi-hemispherical socket 12 in which the ball 11 may be disposed. On the bracket 14 of the plate 13 is a guide plate 15 leading to the socket 12 and when the ball is rested on this guide plate it will be guided thereby into the socket. Pivotally mounted on the plate 15 is a member 16 including a formed portion 17 which embraces the ball 11, above the horizontal center plane thereof, to thereby prevent displacement of the ball from the socket. The member 16 may be pivoted from such position to permit removal of the ball from the socket. The portion of the draft lever 9 adjacent the ball 11 is bent to extend at an angle to the medial portion thereof and when the parts are arranged in normal position the ball is disposed below the plane of said medial portion. The opposite end portion of the draft lever 9 is also bent to extend at an angle to the medial portion thereof, on the same side as the ball 11, and the free end of this portion is pivotally connected at 18 to the lower end of a rack 19 meshed with a pinion 20 fast on the shaft 21 journaled in brackets 22 and 23 mounted on the channel irons 8 and 7 of the drawbar 6. The rack is held in meshed relation with the pinion by a roller 24 carried by the brackets 22 and 23.

The bracket 23 is substantially U-shaped and includes an elongated limb 25 on which there is an angle bracket 26 carrying a bearing 27 in which a shaft 28 is slidably and rotatably journaled. Mounted on the shaft 21 is a disc 29 having a plurality of equidistantly spaced pins 30 extending from the face thereof adjacent the periphery to provide a gear. At the lower end of the shaft 28 is an enlarged flattened portion 31 having a slot 32 therein, providing two teeth 31' and 32'. If desired, the teeth may be in the form of rollers as illustrated in Fig. 5. These teeth provide what is, in effect, a two-toothed pinion and they are meshed with pins 30. As illustrated in Fig. 1, the pin 30' is disposed in the slot 32. When the crank 34 on the shaft 28 is turned counter-clockwise the portion 31 will turn on the tooth 32' to disengage the pin 30' from the slot 32 and as movement is continued the pin 30" will be disposed in said slot 32. Further rotation of the crank will turn the portion 31 on the tooth 31' and thus the succeeding pin will be engaged in the slot 32. In this manner rotative movement of the shaft 28 is imparted to the disc 29 and when the crank 34 is turned in a counter-clockwise direction, as described, the disc 29 will be rotated in a similar direction, as viewed in Fig. 1. This will rotate the shaft 21 and the pinion 20 to cause the rack 19 and therefore the draft lever 9 to move downwardly from the full-line position of Fig. 1 into the dotted-line position thereof to thereby move the drawbar 6 into the dotted-line position. As stated, the implement to which the drawbar 6 is connected is rotatable about the axis thereof and the above described downward movement of the drawbar will pivot the operative portions of the implement downwardly to thereby move them away from operative position and to thereby eventually engage these operative portions in the soil. When the parts are moved in the opposite direction these operative portions will again engage the soil and manifestly the amount these operative portions are moved will determine the depth of cut thereof.

It is sometimes desirable to quickly move the operative portions of the implement to or from the soil and when this is desired the portion 31 will be turned to disengage the slot 32 entirely from the pins. At this time either the tooth 31' or the tooth 32' will be disposed between adjacent pins 30. However, since the shaft 28 is slidably mounted in the bearing 27 it is possible to slide the tooth from the position between these teeth and therefore the disc 29 may be freely turned and thus the position of operative portions of the implement may be readily varied. However, when either the tooth 31' or the tooth 32' is disposed between adjacent pins rotative movement of the disc 29 other than that caused by rotation of the shaft 28 will be prevented. It is therefore apparent that my improved device effectively locks the drawbar 6 and therefore the implement in adjusted positions.

In use, the draft lever 9 will be arranged as illustrated in full lines in Fig. 1. The tractor will be arranged in front of the implement and the member 16 will be pivoted from above the guide plate 15. The ball 11 may then be rested on the guide plate and it will be guided into the socket 12 thereby, after which the plate 16 will be pivoted into the position illustrated in Fig. 4. Thus the medial portion of the draft lever will be supported clear of the drawbar and since a universal connection is provided by the ball and socket joint it is manifest that the tractor may be turned very sharply relative to the implement in an unrestricted manner. The operator will ride on the tractor and by reaching rearwardly he may grasp the crank 34 to rotate the shaft 28 and therefore the operation of the implement may be readily controlled. No locking device is necessary as the disposition of the teeth 31' and 32' relative to the pins will insure against retroactive movement of the disc 29 and this simplifies the operation. When it is desired to quickly vary the operation of the implement the teeth will be retracted from position between the pins and therefore the drawbar 6 may be moved easily. When it is desired to disconnect the implement from the tractor it is only necessary to pivot the member 16 from the position illustrated, after which the ball may be lifted from the socket.

Herein the mechanism has been described as a connecting and adjusting device, but it is also within the purview of my invention to use the mechanism solely as an adjusting device. To accomplish this the drawbar of the tractor may be divided between the front and rear axles, and a mechanism such as that described herein will then be positioned at this division of the drawbar and therefore the rear end of the drawbar may be shifted relative to the front end to bring about an adjusting substantially similar to that described herein.

While I have illustrated and described a selected embodiment of my invention it is to be understood that this is capable of variation and modification and I therefore do not wish to be limited to the precise details set forth but desire to avail myself of such changes and alterations as fall within the spirit and scope of the following claims:

I claim:

1. An attaching and adjusting mechanism including a pivotally mounted member having one end thereof connected to a device, means connecting the other end of said member to another device, and means for moving said member into adjusted positions to move the second device into adjusted positions relative to the first device and including rotatably mounted driving and driven members, a plurality of spaced pins extending from the driven member, and spaced parts on the driving member adapted to be interposed between said pins to successively embrace said pins to rotate said driven member upon rotation of said driving member, said spaced parts interposed between said pins holding the driven member against movement intermediate operations of the driving member to prevent movement of the second device from the adjusted positions into which it is moved.

2. An attaching and adjusting mechanism including a pivotally mounted member having one end thereof connected to a device, means connecting the other end of said member to another device, means for moving said member into adjusted positions to move the second device into adjusted positions relative to the first device, said common means including a rotatably mounted disc having a plurality of spaced apart pins projecting from one face thereof, and a pinion comprising a pair of spaced apart rollers adapted to be interposed between said pins and to successively embrace said pins to rotate said disc, the positioning of said rollers between said pins preventing movement of said disc other than that caused by successive engagement of said rollers with said pins.

3. The combination with a tractor drawbar and an implement drawbar, of a draft lever having the medial portion thereof pivotally connected to the implement drawbar and including end portions, means connecting one of said end portions to the tractor drawbar, a rack connected to the other of said end portions, a pinion mounted on said implement drawbar and meshed with said rack to connect said draft lever to said implement drawbar, and common means for rotating said pinion and holding said pinion against rotation to move said draft lever into and to hold it in different angular positions.

4. The combination with a tractor drawbar and an implement drawbar, of a draft lever having the medial portion thereof pivotally connected to the implement drawbar and including end portions, means connecting one of said end portions to the tractor drawbar, a rack connected to the other of said end portions, and moving and holding means adapted to move and hold said draft lever in different angular positions with respect to the implement drawbar, said moving and holding means being mounted on said implement drawbar and including disengageable portions, said disengageable portions being disengaged to permit free movement of said draft lever.

5. The combination with a tractor drawbar and an implement drawbar, of a draft lever having the medial portion thereof pivotally connected to the implement drawbar and including end portions, means connecting one of said end portions to the tractor drawbar, a rack connected to the other of said end portions, a pinion meshed with said rack, and moving means for turning said pinion to thereby move said rack to move said draft lever into different angular positions with respect to the implement drawbar, said moving means including a slidably and rotatably mounted portion engageable with a movement receiving member to impart rotative movement thereto and adapted to be slid from engagement with said movement receiving member to permit said draft lever to be moved freely into different angular positions.

6. The combination with a tractor drawbar and an implement drawbar, of a draft lever having the medial portion thereof pivotally connected to the implement drawbar and including depending end portions, means connecting one of said end portions to the tractor drawbar, a rack connected to the other of said end portions, a pinion meshed with said rack, a disc movable with said pinion and having a plurality of pins thereon, and means engaged with said pins for rotating said disc and for holding said disc against movement to thereby move said rack to move said draft lever into different angular positions with respect to the implement drawbar.

7. The combination with a tractor drawbar and an implement drawbar, of a draft lever having the medial portion thereof pivotally connected to the implement drawbar and including depending end portions, means connecting one of said end portions to the tractor drawbar, a rack connected to the other of said end portions, a pinion meshed with said rack, a disc movable with said pinion and having a plurality of pins thereon, and means embodying teeth spaced to receive one of the pins on said disc therebetween, said teeth being disposed between pins adjacent the pin therebetween whereby said teeth may be rotated to engage successive teeth to thereby rotate said disc.

8. The combination with a tractor drawbar and an implement drawbar, of a draft lever pivotally connected to the implement drawbar, means connecting one end of said draft lever to the tractor drawbar, a rack connected to the other end of said draft lever, a pinion meshed with said rack, a disc movable with said pinion and having a plurality of pins thereon, and means embodying teeth spaced to receive one of the pins on said disc therebetween, said teeth being disposed between pins adjacent the pin therebetween whereby said teeth may be rotated to engage successive teeth to thereby rotate said disc.

9. The combination with two drawbars, of a lever pivotally connected to one of said drawbars, means connecting one end of said lever to the other of said drawbars, a rack connected to the other end of said lever, a pinion meshed with said rack, a disc movable with said pinion and having a plurality of pins thereon, means embodying teeth spaced to receive one of the pins on said disc therebetween, said teeth being disposed between pins adjacent the pin therebetween whereby said teeth may be rotated to engage successive teeth to thereby rotate said disc, and means supporting the means embodying said teeth whereby said teeth may be moved to or from position between adjacent pins to permit free rotation of said disc when moved from between said pins and to hold said disc against rotation when positioned between said pins.

10. In a device of the class described, a rotatably mounted disc having a plurality of uniformly spaced teeth thereon, a rotatably mounted member having a pair of teeth rotatably mounted thereon and extended at an angle to the teeth on said disc and adapted to receive therebetween a tooth on said disc, said rotatable teeth being adapted to respectively fit between the tooth therebetween and the adjacent teeth on said disc whereby said rotatably mounted member may be rotated to successively position successive teeth on said disc between said pair of rotatable teeth to thereby rotate said disc with said member.

JOHN H. FLATLEY.